United States Patent [19]

Tomyn

[11] Patent Number: 4,478,518
[45] Date of Patent: Oct. 23, 1984

[54] METHOD FOR THE TREATMENT OF WASTE SLUDGE

[75] Inventor: Walter W. Tomyn, Troy, Mich.

[73] Assignee: Michigan Disposal, Inc., Troy, Mich.

[21] Appl. No.: 530,698

[22] Filed: Sep. 9, 1983

Related U.S. Application Data

[62] Division of Ser. No. 264,266, May 18, 1981, abandoned.

[51] Int. Cl.³ .......................... B01F 9/06; B01F 15/02
[52] U.S. Cl. .................................... 366/156; 366/180; 366/181; 366/227; 366/228
[58] Field of Search ...................... 366/20, 35, 37, 38, 366/57, 59, 63, 156, 177, 180, 181, 225, 227, 228; 210/738, 769, 770, 784

[56] References Cited

U.S. PATENT DOCUMENTS

| | | | |
|---|---|---|---|
| 2,835,984 | 5/1958 | Ofner | 210/770 X |
| 3,909,410 | 9/1975 | Neukamm | 210/770 X |
| 4,062,776 | 12/1977 | Blok | 210/403 X |

Primary Examiner—Philip R. Coe
Attorney, Agent, or Firm—Reising, Ethington, Barnard, Perry & Milton

[57] ABSTRACT

A method for the treatment of sludge to cause its solidification and render it suitable for use as landfill by admixtures of chemicals therewith, the method including the steps of feeding the sludge into a sludge hopper and feeding chemicals into a chemical hopper. The sludge and chemicals are continuously fed, each at a controlled feed rate, into a rotating mixing chamber to control the generation of heat in the mixing chamber generated by the combination of sludge and chemicals whereby the sludge and chemicals therein are mixed and caused to move upwardly and longitudinally of the chamber from the inlet opening to the outlet opening thereof.

2 Claims, 10 Drawing Figures

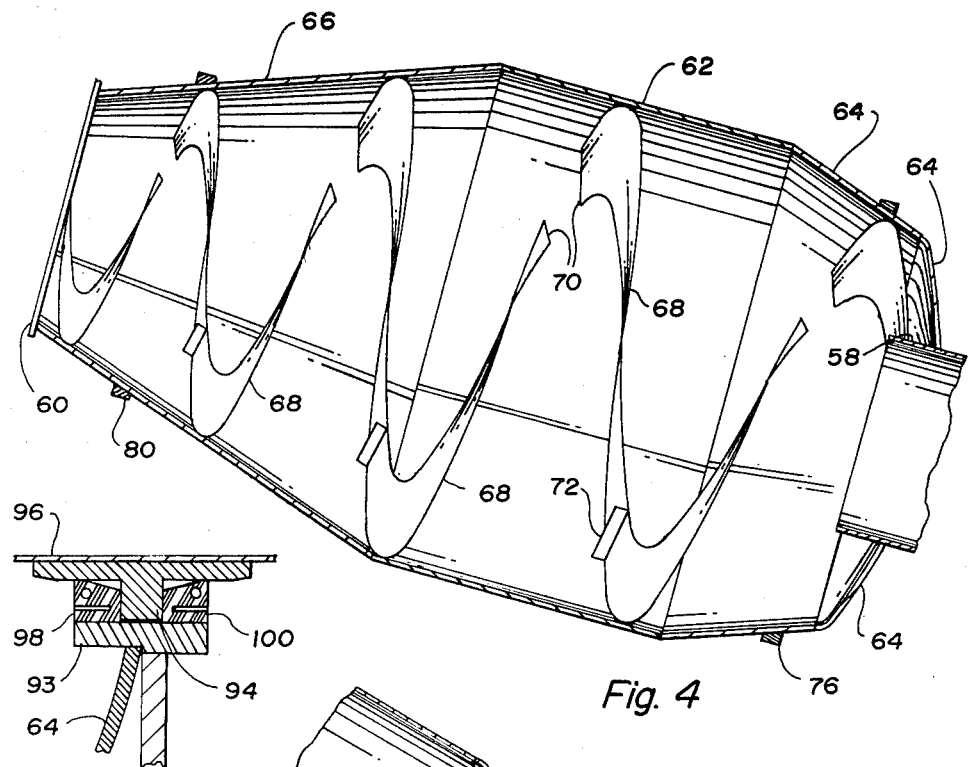
Fig. 4
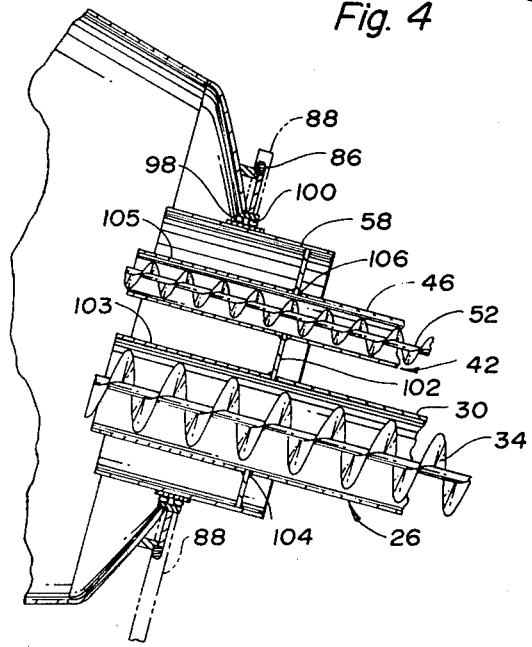
Fig. 10
Fig. 5

METHOD FOR THE TREATMENT OF WASTE SLUDGE

This application is a divisional of application Ser. No. 264,266 filed May 18, 1981, and now abandoned.

TECHNICAL FIELD

The present invention relates to apparatus for treating waste sludge, particularly sewage sludge, by mixing one or more chemicals therewith so as to render the sludge suitable for use as landfill without ecological damage.

BACKGROUND ART

It is well known that sewage sludge can be solidified and rendered biologically suitable for use as landfill by mixing certain chemicals therewith, principally lime or fly ash or both. One manner of accomplishing this is to haul the sludge to the site where it is to be used as fill, spread it on the land, and then till or plow the chemicals into it. This enables relatively little control as regards the uniformity of the mix attained. It is also known to pass the sludge and chemicals through a covered stationary receptacle having motor-driven mixing paddles therein which mix the chemicals with the sludge. One of the problems with such a system is that the mixing paddles which move with respect to the receptacle, and the necessary power shaft inputs and associated seals, are subject to considerable wear and tear. Further, since the reaction of the chemicals with the sludge can be exothermic and generate vapors such as steam which can escape into the atmosphere, there can be a problem of polluting the atmosphere with noxious ingredients. U.S. Pat. No. 4,079,003 shows an apparatus wherein, as a solution to this problem, the receptacle is provided with a cover with an opening for escape of the steam through a water-spray chamber which removes the contaminants. This leaves the problem of disposing of the contaminated water, adds complexity and cost, and adds still further to maintenance problems.

DISCLOSURE OF INVENTION

The present invention provides a method for the treatment of sludge to cause its solidification and render it suitable for use as landfill by admixture of chemicals therewith, the method including the steps of feeding the sludge into a sludge hopper positioned adjacent an elongated mixing chamber which is rotated at a controlled rate of rotation about its longitudinal axis and which has an opening at one longitudinal end thereof to provide entrance for the sludge and the chemicals to be mixed in an opening at the other longitudinal end thereof for exit of the sludging chemicals after they are mixed, the mixing chamber having a generally cylindrical center portion. The mixing chamber further has a frustoconical end portion at the one end thereof tapering from the center portion toward the first mentioned opening and a generally frustoconical portion at the other end thereof tapering from the center portion toward the second mentioned opening. The mixing chambers is oriented with this longitudinal axis canted upwardly from the first mentioned opening to the second mentioned opening at an angle from about 10° to 20° to the horizontal and the mixing chamber has inwardly extending elongated generally helical shaped mixing blades fixed secured to its inner walls of the cylindrical and frustoconical portions. Chemicals are fed into a chemical hopper positioned adjacent the mixing chamber. The sludge is fed from the sludge hopper and chemicals from the chemical hopper continuously, each at a controlled feed rate, into the first mentioned opening of the rotating mixing chamber to control the generation of heat in the mixing chamber generated by the combination of sludge and chemicals whereby the sludge and chemicals therein are mixed and caused to move upwardly and longitudinally of the chamber from the first mentioned opening to and then out of the second mentioned opening.

BRIEF DESCRIPTION OF THE DRAWINGS

FIG. 4 is a side view in section, of the mixing chamber shown in FIG. 3 and showing the mixing blades.

FIG. 5 is a sectional view of the entrance opening of the chamber showing the means for sealing same to prevent the escape of vapors or particulate material to the atmosphere at this location and showing the means conveying the sludge and chemicals into the chamber.

FIG. 10 is a sectional view, in enlarged scale and with parts broken away, of the sealing means shown in FIG. 5.

BEST MODE FOR CARRYING OUT THE INVENTION

Figure 1:
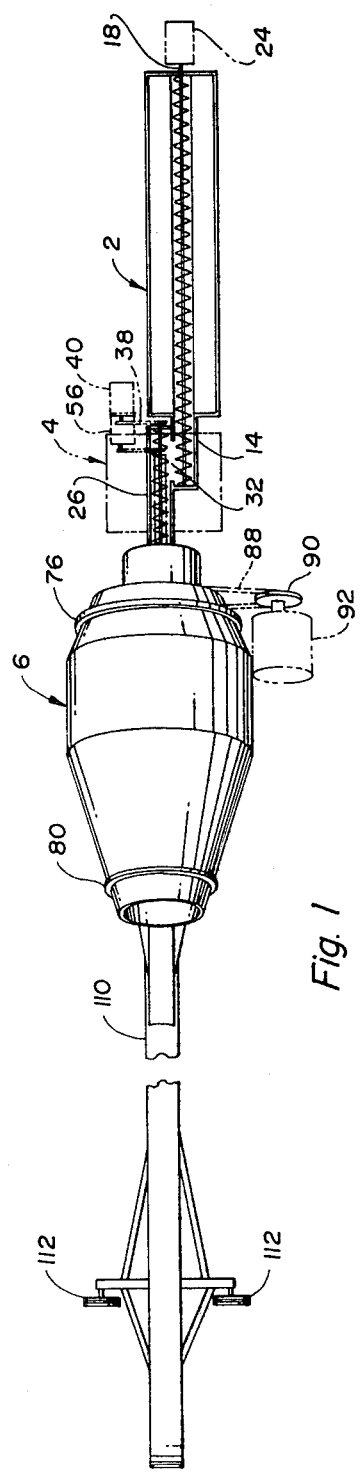
FIG. 1 is a top view of a preferred embodiment of the apparatus.
Figure 2:
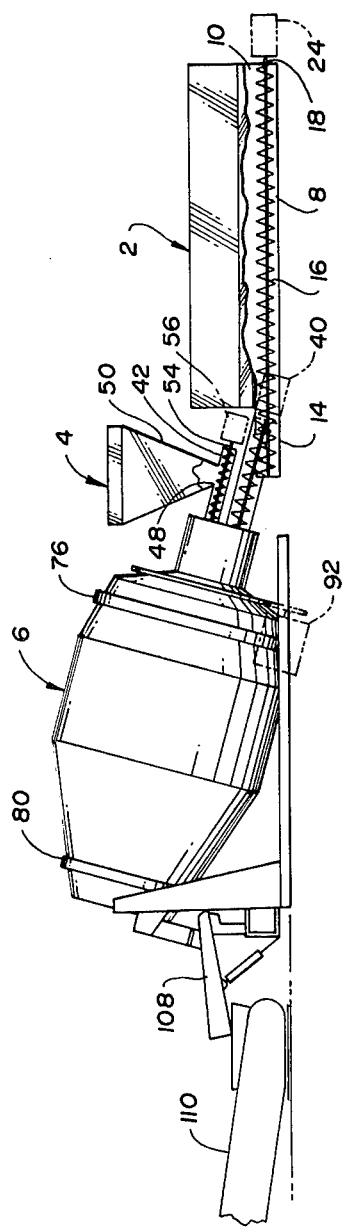
FIG. 2 is a side view of the apparatus shown in FIG. 1.
Figure 3:
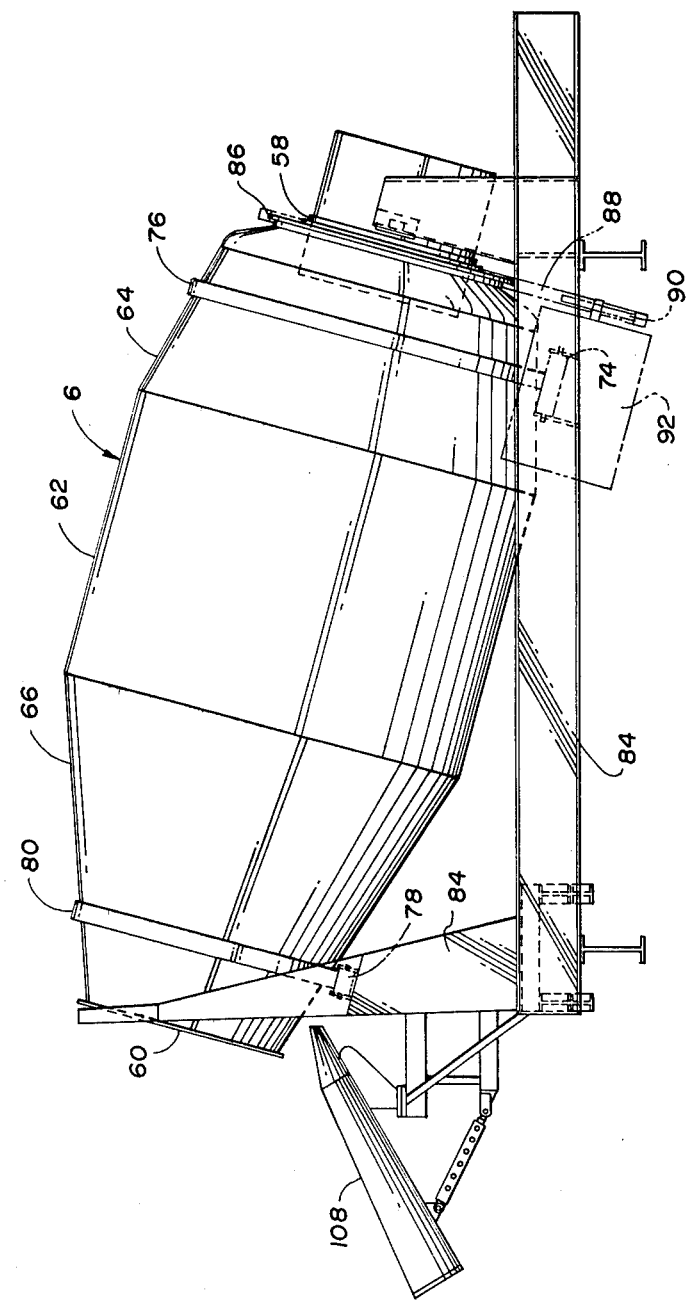
FIG. 3 is a side view, in enlarged scale of the mixing chamber and adjacent components of the apparatus shown in FIGS. 1 and 2.

Referring now to FIGS. 1 and 2 of the drawings, the apparatus shown comprises a sludge hopper 2 for receiving the sludge to be treated, a chemical hopper 4 for the chemicals to be mixed with the sludge, a mixing chamber 6 for mixing the chemicals with the sludge along with means, hereinafter described, for conveying the sludge and chemicals into the mixing chamber.

Figure 7:
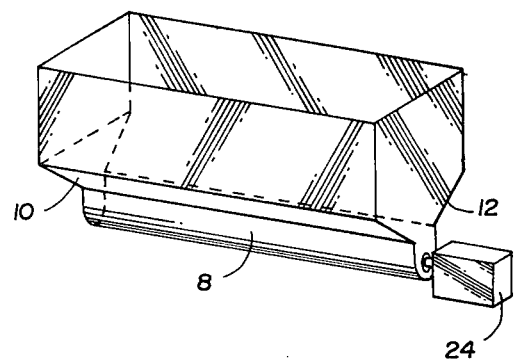
FIG. 7 is a perspective view, in enlarged scale, of the sludge hopper of the FIGS. 1 and 2 apparatus.
Figure 8:
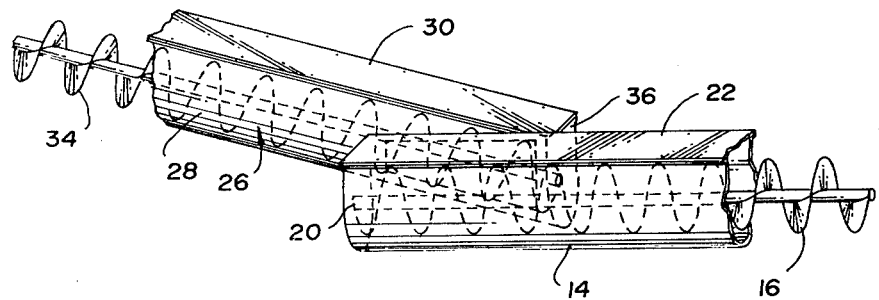
FIG. 8 is a perspective view, with parts broken away, showing a portion of the sludge-feeding conduit and augers of the FIGS. 1 and 2 apparatus.

The sludge hopper, best shown in FIG. 7, has an elongated trough 8 as its bottom wall and oppositely disposed side walls 10 and 12, the bottom portions of which taper downwardly and inwardly toward the trough whereby the sludge in the hopper flows by gravity into the trough. The bottom wall of the trough is semi-cylindrical shape. An extension 14 of the trough (see FIGS. 1, 2 and 8) extends to the exterior of the sludge hopper, there being an opening in the end wall of the hopper to which the extension is secured such that the sludge in the hopper can move into the trough extension. The trough extension has the same cross-section shape as the trough, the bottom wall thereof being semi-cylindrical. An auger 16 extends the length of the trough 8 and its extension 14, the shaft end of the auger extending through and being suitably rotatably supported within the openings 18 and 20 in the end wall of the trough and the end wall of the trough extension, respectively. The trough extension 14 is covered by a plate 22 removably secured thereto as by bolts, and a motor 24 to which the shaft of the auger is connected serves as a drive means for rotating the auger thereby to move sludge from the trough into the covered trough extension 14.

A conduit 26 extends from the trough extension 14 to the mixing chamber, this conduit having a trough-shaped portion 28 forming the side walls and the bottom wall of cylindrical curvature, the top of the conduit being formed by a plate 30 removably secured as by bolts, to the bottom portion of the conduit. The lower end of the conduit 14 is positioned laterally of the trough extension 14, there being an opening 32 in the side wall of the trough extension 14 which communicates with an opening of like shape in the adjacent side wall of the conduit 26 whereby sludge in the trough extension can move laterally into the lower end of the conduit 26. An auger 34 extends the length of the conduit 26, the shaft of the auger 34 extending through and being suitably rotatably supported within an opening in the bottom end wall 36 of the conduit. The shaft of the auger 34 connects, as by sprockets and chain 38, to a motor 40 which serves as a drive means for rotating the auger 34 thereby to move the sludge entering the conduit, through opening 32, and then through the conduit and into the mixing chamber. The auger 34 has a diameter substantially the same as the inner diameter of the cylindrical-shaped bottom wall of the conduit 26, just as the auger 16 has a diameter substantially the same as the internal diameter of the cylindrical-shaped bottom wall of the trough 8 and its extension 14. The structure, as described, of the trough extension 14 and of the conduit 26 is advantageous in that the top plates, 22 and 46 respectively, can be removed to provide access to the interiors of the trough extension and conduit. This enables easy maintenance. Hence if, as can sometimes occur, the sludge contains solid bodies or other materials which cause jamming of either or both of the augers, there is ready access to the sludge in the trough extension and in the conduit to enable removal of bodies or other materials causing the problem.

Figure 6:
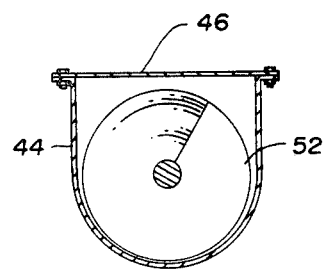
FIG. 6 is a sectional view, in enlarged scale, showing the chemical feed conduit and auger of the FIGS. 1 and 2 apparatus.

Another conduit 42 extends from the bottom of the chemical hopper 4 to the mixing chamber 6, this conduit also having the structure as described with reference to conduit 26, comprising a trough-shaped bottom portion 44 and a top plate 46 removably secured thereto (See FIG. 6). An opening 48 in the plate connects to the tapered bottom 50 of the chemical hopper such that the chemical in the hopper can flow under gravity into the conduit 42. An auger 52 extends the length of the conduit 42, the shaft of the auger 52 extending through and being suitably rotatably supported within an opening in the end wall 54 of the conduit. A motor 56 to which the shaft of auger 52 is connected serves as the drive means to rotate the auger 52 thereby to move the chemicals entering the conduit, through opening 48, and then through the conduit and into the mixing chamber. Just as in the case of the other augers described, so also the auger 52 has a diameter substantially the same as the inner diameter of the cylindrical-shaped bottom wall of the conduit 42. Though there is less likelihood of the chemicals containing bodies or materials would jam the auger 52, the removable plate of the conduit 42 is nevertheless advantageous for maintenance purposes.

Referring to FIGS. 1-5, the mixing chamber 6 has a round opening 58 at one end thereof to enable entrance of the sludge and chemicals into the chamber, and a round opening 60 at the other end thereof for exit of the sludge and chemicals, in mixed form, from the mixing chamber. Further, the mixing chamber has a cylindrical center portion 62, a generally frusto conical end portion 64, tapering, first gradually and then steeply, from the center portion toward the opening 58 and a frusto conical portion 66 at the other end thereof tapering from the cylindrical center portion toward the exit opening 60. Fixedly secured, as by welding, to the interior of the walls of the cylindrical and frusto conical portions are inwardly extending elongated generally helical shaped mixing blades as shown at 68. These blades can have their ends juxtaposed so as to provide, in combination, one continuous helical blade extending substantially from one end to the other of the mixing chamber; however, it is preferred that the ends of the blades, or at least some of them, be spaced so as to provide interruptions, as shown at 70. Also, it is preferred that some or all of the helical blades be provided with plates, one of which is shown at 72, which extend generally perpendicularly to the helical blade portion to which the plate is fixedly secured, as by welding.

In the embodiment shown, the mixing chamber has a length of about 12' and a diameter, at its center portion, of about 6', the helical blades being about 18" in width (i.e. extending generally radially inwardly about 18"), there being four spaced interruptions, one of which is shown at 70, and there being four spaced plates, one of which is shown at 72, each of these plates being dimensioned to extend about 10" generally perpendicularly outwardly of the helical blade portion to which it is secured.

The mixing chamber 6 is oriented such that its longitudinal axis is at an angle of from about 10° to 20°, and preferably 15°, to the horizontal, the opening 58 being at the lower end of the canted mixing chamber and the exit opening 60 being at the upper end. The mixing chamber is rotatably supported in this position by a plurality of heavy-duty rollers, one of which is shown at 74, which engage a ring 76 secured to the frusto conical portion 64, and by another plurality of heavy-duty rotatable rollers, one of which is shown at 78, which engage a ring 80 secured to the frusto conical portion 66 of the mixing chamber. The rollers are circumferentially spaced along the ring with which they are engaged, from one side to the other of the bottom of the chamber whereby the chamber can be rotated while supported by the rollers which are rotated about their respective shafts by reason of their rotating contact with the rings, the shafts of the rollers being suitably secured to a supporting framework as depicted at 84.

The steeply tapered end of the generally frusto conical portion 64 of the mixing chamber has fixedly secured thereto an annular ring with radially outwardly extending circumferentially equally spaced teeth, this ring functioning as a sprocket 86 engaged by a chain 88 in the form of a continuous loop, this chain being also engaged with a sprocket 90 driven by a motor 92, this motor serving as the drive means for rotating the mixing chamber, through the chain and sprocket connection shown and described.

The opening 58 of the mixing chamber is formed by a ring 83 which is in sealed rotatable close spaced relationship with another ring 94 fixedly secured around a cylinder 96 which remains stationary while the mixing chamber rotates. Rings of elastomeric material 98 and 100 to either side of the ring 94 and fixedly secured to ring 93 provide a seal between the cylinder 96 and the ring 93 which defines the opening 58 of the chamber to prevent any significant escape of vapors or suspended particulate material, such as the chemicals, from the lower end of the mixing chamber. A round plate 102 is fixedly secured, as by welding within the cylinder. This plate 102 has an opening 104 toward the bottom thereof for entrance of the auger 34, and an upper opening 106 for entrance of the auger 52. The trough-shaped portion 28 of the conduit 26 is fixedly secured and sealed to the bottom and side portions of the periphery of the opening 104 and the top plate 30 of the conduit 26 which is removably secured to the portion 28 abuts the plate 102. A round pipe 103 secured to the plate 102 forms an extension to conduit 26 extending to the interior of the mixing chamber and receiving the end of auger 34. The entrance structure of conduit 42 relative to the mixing chamber is the same as just described with reference to conduit 26, pipe 105, secured to plate 102, forming an extension of conduit 26 into the chamber and receiving the end of auger 52. Likewise, just as described with reference to conduit 26, the bottom trough-shaped portion of conduit 42 is secured to the plate 102 and the removable top plate 46 abuts the plate 102. Hence, each of the conduits (i.e. the extensions 103 and 105 thereof), and the augers therein, extends a distance beyond to the plate 102, into the mixing chamber, the sludge and chemicals conveyed through the conduits by the augers dropping downwardly into the bottom of the mixing chamber from the open ends of the conduits. The ends of the augers 34 and 52 within the chamber 6 are unsupported except by their contact with the bottoms of the pipes 103 and 105, respectively, through which they extend. This is advantageous in providing structural simplicity and hence lessened maintenance.

Underneath the exit opening 60 of the mixing chamber a suitably supported trough 108 receives the mixture which exits through the opening and directs it to an endless belt conveyor 110. The endless conveyor is supported by ground-engaging wheels 112 and 114 with their planes of rotation being at right angles to the longitudinal axis of the conveyor whereby the conveyor can be pivoted in a horizontal plane, the trough also being pivotable so that it can be aligned with the conveyor at any angle at which the conveyor is positioned in a horizontal plane with respect to the longitudinal axis of the mixing chamber.

Figure 9:
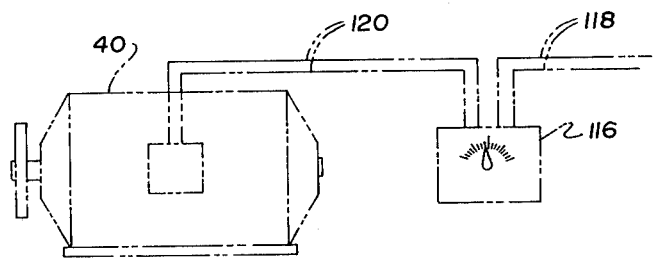
FIG. 9 is a schematic view showing the drive and drive control means for the apparatus shown in FIGS. 1 and 2.

The rate at which the sludge is fed into the mixing chamber is controlled by the rate of rotation of the auger 34, rate of rotation of the auger 16 always being such that it feeds the sludge into the conduit 26 at the same rate that the auger 34 feeds the sludge into the mixing chamber. The rate at which the chemicals are fed into the mixing chamber is determined by the rate of rotation of the auger 52. Hence, the respective rates at which the sludge and chemicals are moved into the mixing chamber is dependent on the rates of rotation imparted to the augers by their respective drive means. Each of these drive means is provided with a control means for controlling the rate at which the drive means drives the auger. This is schematically shown in FIG. 9 with respect to the drive means for auger 34 which moves the sludge into the mixing chamber, 40 being the drive means which is an electric motor, 116 being the control means, 118 depicting the electrical connections to the control means and 120 depicting the electrical connections between the control means and the motor. The drive means for the other augers are likewise provided with such control means as depicted. This enables metering of the chemicals into the mixing chamber in the desired proportion with respect to the amount of sludge fed into the chamber.

The drive means 92 for rotating the mixing chamber is likewise provided with such control means for controlling the rate of rotation of the chamber.

In operation, the rotation of the mixing chamber is set at a rate sufficiently low (preferably from about 5 to 15 revolutions per minute), that there is relatively little centrifugal force acting on the material in the mixing chamber. Hence, as the mixing chamber rotates it is only the helical mixing blades and the frictional contact of the mixture with the chamber and blades that significantly causes the mixture to climb the chamber wall a distance before falling down, under gravity, to the bottom of the chamber thereby providing the mixing action. It is preferred that the volume of the sludge and chemicals being mixed in the chamber at any given time not exceed about one-half (½) the total volume of the chamber, the angle at which the chamber is oriented to the horizontal, as described, being significant in this regard. Because the respective rates of rotation of the augers determine the respective rates at which the sludge and chemicals are fed into the chamber, the controls for the auger drive means serve as controls for metering the sludge and chemicals into the chamber in the ratio desired thereby dispensing with any need for metering valves. These features along with the others which have been described, such as a means for supporting the augers and the structure of the sludge and chemical feed conduits, enables continued trouble-free operation of the apparatus with low maintenance downtime and costs. Also contributing to the reduction in maintenance costs is the fact that a mechanism for imparting the mixing motion within the mixing chamber is external of the mixing chamber and hence out of contact with the sludge and chemicals, this as distinguished from apparatus wherein the mixing is by way of mixing blades or paddles which move relative to a stationary chamber and requiring shaft seals or the like.

It will be understood that whereas the invention has been described with reference to a preferred embodiment thereof, various changes and modifications may be made all within the full and intended scope of the claims which follow.

What is claimed is:

1. A method for the treatment of sludge to cause its solidification and render it suitable for use as landfill by admixture of chemicals therewith, said method comprising the steps of:

feeding the sludge into a sludge hopper positioned adjacent an elongated mixing chamber which is rotated at a controlled rate of rotation about its longitudinal axis and which has an opening at one longitudinal end thereof to provide entrance for the sludge and the chemicals to be mixed and an opening at the other longitudinal end thereof for exit of the sludge and chemicals after they are mixed, said mixing chamber having a generally cylindrical center portion, a generally frustoconical end portion at said one end thereof tapering from said center portion toward said first-mentioned opening and generally frustoconical portion at said other end thereof tapering from said center portion toward said second-mentioned opening, said mixing chamber being oriented with its longitudinal axis canted upwardly from said first-mentioned opening to said second-mentioned opening at an angle of from about 10° to 20° to the horizontal and said mixing chamber having inwardly extending elongated generally helical shaped mixing blades fixedly secured to its inner walls of said cylindrical and frustoconical portions;

feeding the chemicals into a chemical hopper positioned adjacent said mixing chamber; and continuously feeding sludge from said sludge hopper and chemicals from said chemical hopper, each at a controlled feed rate, into the first-mentioned opening of said rotating mixing chamber to control the generation of heat in the mixing chamber generated by the combination of sludge and chemicals whereby the sludge and chemicals therein are mixed and caused to move upwardly and longitudinally of the chamber from said first mentioned opening to and then out of said second-mentioned opening.

2. A method as set forth in claim 1 wherein the mixing chamber is rotated at a rate of about 5 to 15 revolutions per minute and wherein the volume of the sludge and chemicals being mixed in the chamber at any given time does not exceed about one-half the total volume of the mixing chamber.

* * * * *